United States Patent
Matsushima (10) Patent No.: US 6,266,317 B1
(45) Date of Patent: Jul. 24, 2001

(54) LIBRARIES FOR ACCOMMODATING CARTRIDGE STORAGE MEDIA

(75) Inventor: Takaaki Matsushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/276,810

(22) Filed: Mar. 26, 1999

(30) Foreign Application Priority Data

Mar. 27, 1998 (JP) .................................................. 10-100140

(51) Int. Cl.⁷ .................................................... G11B 15/68
(52) U.S. Cl. ............................................................. 369/191
(58) Field of Search .................................. 369/98.04, 34, 369/35, 36, 37, 38, 178, 191–194, 69; 360/91, 92, 98.01, 98.02, 98.03, 98.04, 98.05, 98.06, 98.07, 98.08; 364/478.03

(56) References Cited

U.S. PATENT DOCUMENTS

| | | | |
|---|---|---|---|
| 4,910,619 | 3/1990 | Suzuki et al. ............................ 360/92 |
| 5,031,057 | * 7/1991 | Kikuchi et al. ......................... 360/92 |
| 5,124,975 | * 6/1992 | Naoki et al. ........................... 369/291 |
| 5,432,419 | 7/1995 | Watanabe et al. .................... 318/560 |
| 5,432,656 | * 7/1995 | Motoyama et al. ................... 360/69 |
| 5,703,843 | 12/1997 | Katsuyama et al. .................... 369/34 |
| 5,729,464 | * 3/1998 | Dimitri ............................ 364/478.03 |
| 5,828,646 | * 10/1998 | Jones ..................................... 369/178 |
| 5,959,803 | * 9/1999 | Okamoto et al. ...................... 360/92 |
| 6,144,519 | * 11/2000 | Hanaoka et al. ....................... 360/92 |

FOREIGN PATENT DOCUMENTS

| | | |
|---|---|---|
| 0 694 917 A2 | 1/1996 | (EP) . |
| 63-157357 | 6/1988 | (JP) . |
| 63-313345 | 12/1988 | (JP) . |
| 1-285056 | 11/1989 | (JP) . |
| 2-24864 | 1/1990 | (JP) . |
| 3-259450 | 11/1991 | (JP) . |
| 5-144156 | * 6/1993 | (JP) . |
| 7-37312 | * 2/1995 | (JP) . |
| 10-79153 | 3/1998 | (JP) . |

* cited by examiner

Primary Examiner—William Klimowicz
Assistant Examiner—Tianjie Chen
(74) Attorney, Agent, or Firm—McGuireWoods LLP (57) ABSTRACT

A library capable of receiving storage media or the like with a high storage efficiency, being simple in construction to permit reduction of the cost of manufacture and permitting access time reduction is disclosed. The library comprises storage units 4 and 5 each capable of storing a plurality of cartridges 50 accommodating storage media one above another, a drive unit 2 for reading and writing data out of and in the storage media, and a cartridge transfer mechanism 3 for transferring the cartridges 50 between the drive unit 2 and the storage units 4 and 5. The storage units 4 and 5 can each store a plurality of cartridges 50 and accommodate a cartridge 50 having been rotated horizontally by approximately 90 degrees with respect to a cartridge inserting direction of the library.

6 Claims, 7 Drawing Sheets

LIBRARIES FOR ACCOMMODATING CARTRIDGE STORAGE MEDIA

BACKGROUND OF THE INVENTION

The present invention relates to libraries and more particularly, to libraries for accommodating cartridges accommodating storage media.

Libraries for accommodating storage media to be loaded in personal computers or the like are subject to stringent dimensional restrictions. This dictates appropriate methods of accommodating cartridges. A variety of libraries thus have heretofore been proposed and used.

Figure 7:
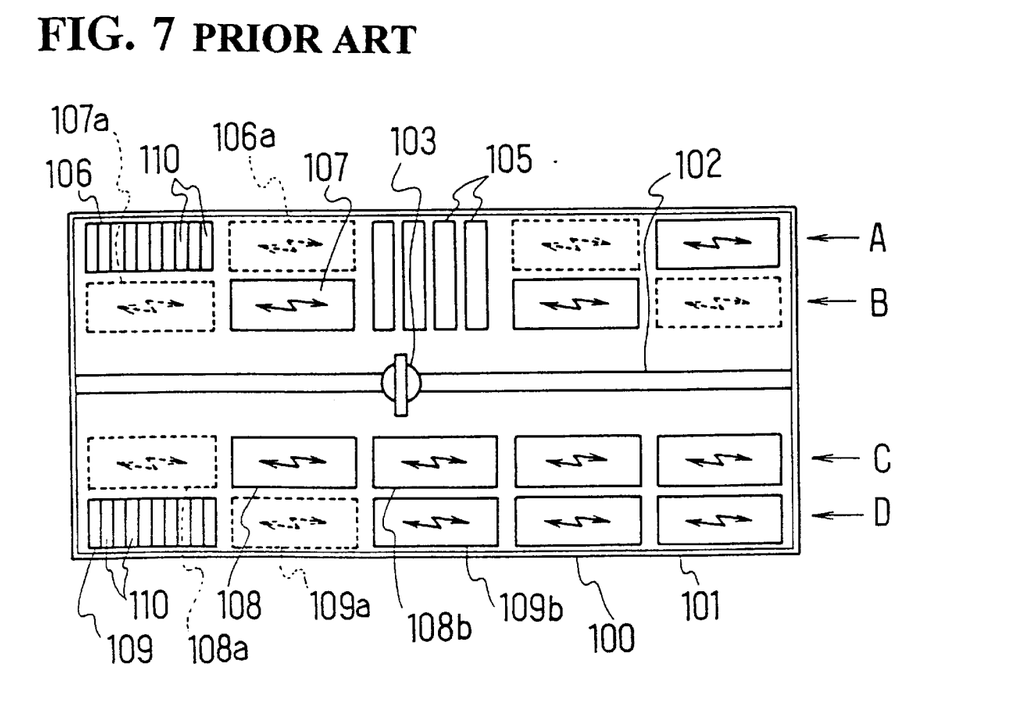
FIG. 7 and FIGS. 8(a) and 8(b) are views representing prior art libraries.
Figure 8A:
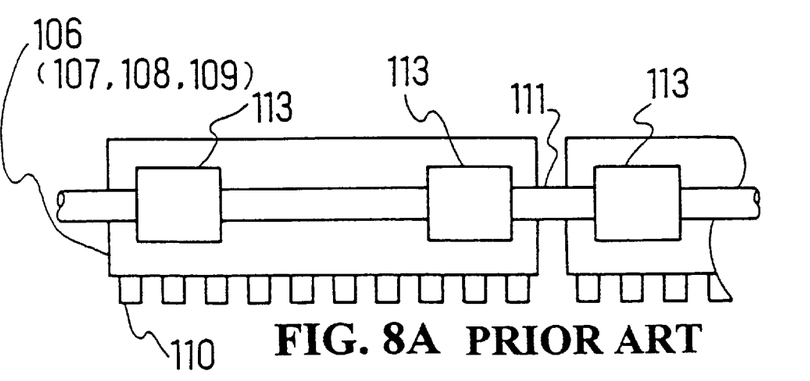
Figure 8B:
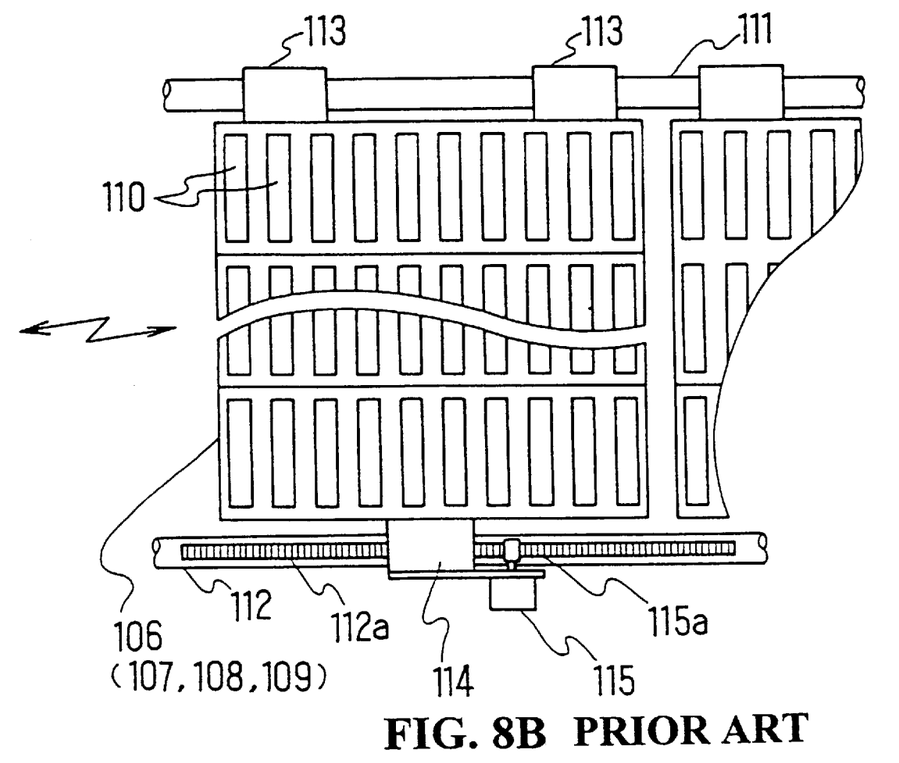

FIGS. 7 and 8 show an example of such library, which is disclosed in Japanese Patent Disclosure No. 1-285056. This library has a path 102 provided centrally of a housing 101. A cartridge transfer mechanism 103 is provided for movement along the path 102. The library further comprises a drive unit 105 facing the path 102 and storage units 106 to 109 disposed in four rows A to D on the opposite sides of the path 102.

The rows A to D consist of pluralities of storage units 106 to 109, respectively. In each of these rows, a space corresponding to one storage unit, as shown by dashed rectangle in FIG. 7, is provided so that the storage units are movable along the row. The storage units 106 to 109 are supported on guide rails 111 and 112 supported in the housing 101, and are movable only horizontally along the rails via coupling members 113 and 114 mounted on them. That is, the storage units 106 to 109 are movable along a rack 112a mounted on the rail 112a by prime motors 115 provided therein and each having a pinion 115a meshing with the rack 112a.

In operation, for the transfer of a cartridge 110 from the storage unit 107 or 108 to the drive unit 105, the cartridge transfer mechanism 103 takes out the given cartridge 110 from the storage unit 107 (or 108). The taken out cartridge 110 is conveyed and then inserted into the drive unit 105. For the transfer of a cartridge 110 from the storage unit 106 or 109 to the drive unit 105, the storage unit 107 or 108 located ahead of the storage unit 106 (or 109) with the given cartridge 110 stored therein, is moved to a position able to be accessed by the cartridge transfer mechanism 103. Then, the cartridge transfer mechanism 103 can take out the cartridge 110 and, like the above case, insert the same into the drive unit 105.

The above prior art library, however, has a problem that the spaces necessary for moving the storage units deteriorate the accommodation efficiency. In addition, a prime drive source is necessary for each storage unit, and each storage unit should be positioned at a predetermined position. Furthermore, flexible cables are necessary for transmitting signals from sensors to a control unit. For the above reasons, the whole mechanism is relatively complicated, and also a large number of necessary drive sources dictate a large number of parts, thus leading to high cost. Still further, for increasing the access speed the storage units should be moved at a time. In this case, however, collision of storage units are possible unless all the storage units are moved at a constant speed. In the long run, the storage units have to be moved one by one, leading to access time increase. Moreover, spaces corresponding to at least two storage units are necessary, and the width of the library is correspondingly increased.

SUMMARY OF THE INVENTION

The invention was made in view of the above problems inherent in the prior art libraries, and an object of the present invention is to provide a library having a high storage medium accommodation efficiency, simple in construction, with a low cost in manufacture to reduce access time and width.

According to an aspect of the present invention, there is provided a library comprising storage unit capable of storing a plurality of cartridges accommodating storage media one above another, a drive unit for reading and writing data from and in the storage media, and a cartridge transfer mechanism for transferring the cartridges between the drive unit and the storage unit, wherein: the storage unit stores a plurality of cartridges mounted therein and accommodates a cartridge having been rotated horizontally by approximately 90 degrees with respect to a cartridge inserting direction of the library.

The library according to claim 1, wherein the storage unit with the cartridges mounted therein is moved along an approximately L-shaped groove to cause straight movement and rotation by approximately 90 degrees, thereby moving the cartridges to a position accessible by the cartridge transfer mechanism. The storage unit has guide pin means projecting from the bottom surface, a track member having the substantially L-shaped groove for guiding the guide pin means is disposed beneath the storage unit, a movable member having projection means capable of being brought into contact with the guide pin means is disposed beneath the track member, the storage unit being capable of being moved along the substantially L-shaped groove with movement of the guide pin means along the substantially L-shaped grove. The library according to claim 1, wherein the cartridge transfer mechanism serves to rotate a cartridge mounted in the storage unit by approximately 90 degrees, then takes out the cartridge in this state, then rotates the taken-out cartridge in the opposite direction by approximately 90 degrees and then load the cartridge in the drive unit.

According to another aspect of the present invention, there is provided a library comprising: a drive unit disposed in a rear top part of the library and serving to read and write data from and in a storage medium accommodated in a cartridge; a cartridge transfer mechanism disposed ahead of the drive unit such as to be able to access the cartridge therein and serving to move the cartridge; first storage unit capable of accommodating a cartridge having been rotated by 90 degrees with respect to a cartridge inserting direction of the library, being moved and rotated when accessed by the cartridge transfer mechanism and accommodating a plurality of cartridges one above another; second storage unit disposed transversally symmetrically with and having substantially the same role as the first storage unit; a storage unit transfer mechanism for moving the first and second storage units; a control unit for controlling the cartridge transfer mechanism and the storage unit transfer mechanism.

The storage unit transfer mechanism includes: first carrier, for supporting the first storage unit, comprising depending long pins each having a free end portion and a depending short pin; second carrier, for supporting the second storage unit, comprising depending long pin and a depending short pin; track member disposed beneath the first and second carriers, and having an L-shaped and transversally symmetrical groove in which the long and short pins are received; movable member in shape of disc-like which has projections formed at the top and is supported for rotation about a point in a central part of the library; a gear train disposed adjacent to the outer periphery of the movable member, which is constituted by a plurality of gears and serves to transmit the torque of a motor to the movable member.

According to other aspect of the present invention, there is provided a library comprising: a drive unit disposed in lower central part of the library and serving to read and write data from and in media accommodated in cartridges; a cartridge transfer mechanism disposed at a position ahead of and accessible to a cartridge and serving to cause movement and rotation of the cartridge; and a plurality of storage units each capable of accommodating a cartridge having been rotated by 90 degrees with respect to a cartridge inserting direction of the library.

Other objects and features will be clarified from the following description with reference to attached drawings.

PREFERRED EMBODIMENTS OF THE INVENTION

Preferred embodiments of the present invention will now be described with reference to the drawings.

Figure 1:
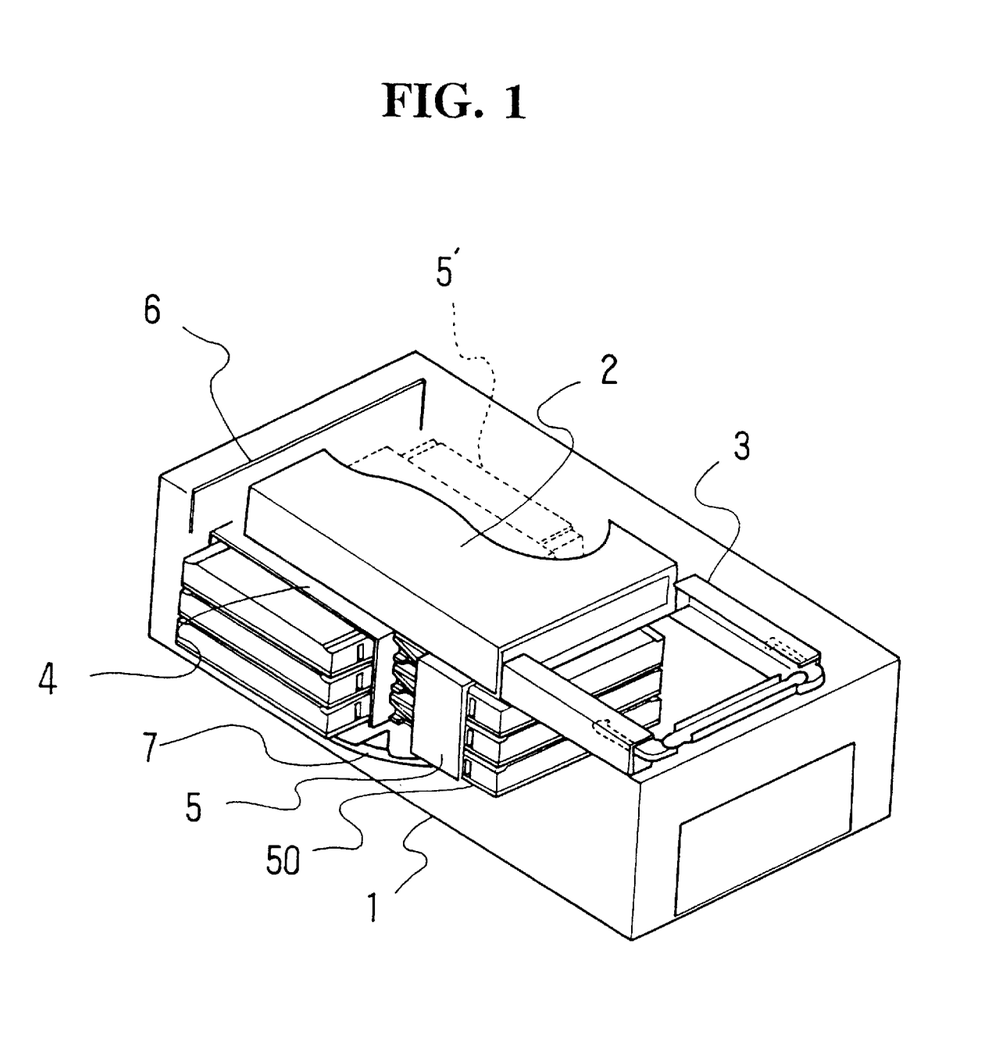
FIG. 1 is a view showing an embodiment of the library according to the present invention.

FIG. 1 is a view showing an embodiment of the library according to the present invention. The illustrated library 1 comprises a drive unit 2 disposed in a rear part of its top and serving to read and write data from and in a storage medium accommodated in a cartridge 50, a cartridge transfer mechanism 3 disposed ahead of the drive unit 2 such as to be able to access the cartridge 50 therein and serving to move the cartridge 50, a storage unit 5 (or 5') capable of accommodating a cartridge 50 having been rotated by 90 degrees with respect to a cartridge inserting direction of the library, being moved and rotated when accessed by the cartridge transfer mechanism 3 and accommodating a plurality of cartridges 50 one above another, another storage unit 4 disposed transversally symmetrically with and having the same role as the storage unit 5, a storage unit transfer mechanism 7 for moving the storage units 4 and 5, and a control unit 6 for controlling the cartridge transfer mechanism and the storage unit transfer mechanism.

Figure 2A:
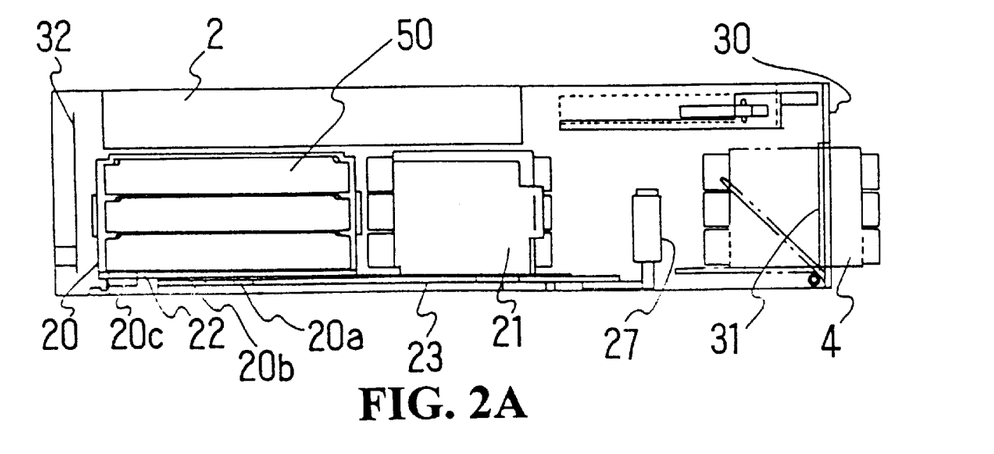
FIGS. 2(a) and 2(b) are views representing detailed structure of the library according to the embodiment.
Figure 2B:
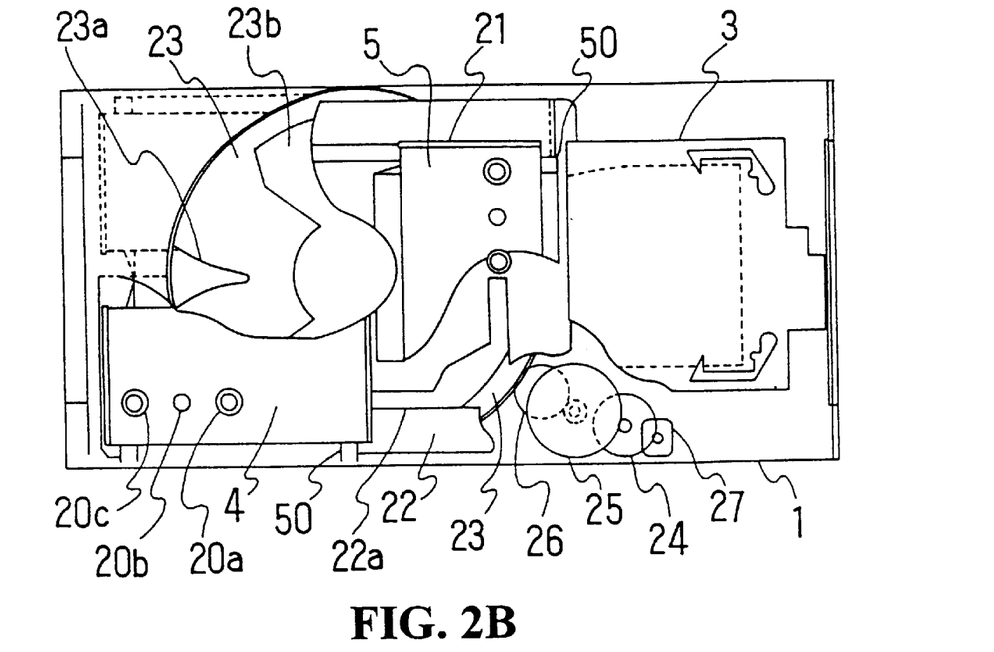

The storage unit transfer mechanism 7 will now be described in detail with reference to FIG. 2. The storage unit transfer mechanism 7 includes carriers 20 and 21, a track member 22, a movable member 23, a gear train constituted by a first to a third gear 24 to 26 and a motor 27.

The carrier 20 supports the storage unit 4, and has depending long pins 20a and 20c (each having a free end portion projecting downward for the track member 22 to be described later) and also a depending short pin 20b (having a free end at the same level as the lower surface of the track member 22). The carrier 21 supports the storage unit 5 and, like the carrier 20, has depending long pins 21 and 21c and a depending short pin 21b. The track member 22 is disposed beneath the carriers 20 and 21, and has an L-shaped, transversally symmetrical groove 22a, in which the pins 20a to 20c and 21a to 21c are received.

The movable member 23 is disc-like in shape, and has projections 23a and 23b formed at the top. The movable member 23 is supported for rotation about point A in a central part of the library 1. A gear train to be described later is disposed adjacent to the outer periphery of the movable member 23. The gear train is constituted by first to third gears 24 to 26, and serves to transmit the torque of a motor 27 to the movable member 23. At the front of the library 1, a front mask 30 and a door 31 as in inlet for charging the storage units 4 and 5 therethrough into the library 1 are provided.

The operation of the library 1 having the above construction will now be described. First, a method of storage unit replacement (by moving a storage unit to a position capable of being accessed by the cartridge transfer mechanism 3) will be described.

FIGS. 3(a) to 3(f) are plan views, partly broken away, illustrating the operation of moving a storage unit to a position to be accessed by the cartridge transfer mechanism 3. In the Figures, the storage unit transfer mechanism 7 is mainly drawn, and other elements unnecessary for the description of the operation are omitted.

Figure 3A:
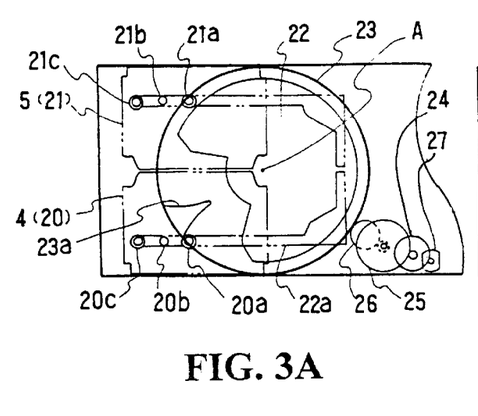
FIGS. 3(a) to 3(f) are plan views, partly broken away, illustrating the operation of moving a storage unit to a position to be accessed by the cartridge transfer mechanism 3 in FIG. 1.

In FIG. 3(a), both the storage units 4 and 5 are in their stand-by state. In this state, the motor 27 is driven, thus causing reduction of the rotational number of the motor 27 via the first to third gears 24 to 26 and transmitting the torque of the motor 27 via the third gear 26.

As a result, the movable member 23 turns to be rotated about the point A. After a certain period of time from the start of the rotation, the projection 23a of the movable member 23 is brought into contact without the pin 20a mounted on the carrier 20 supporting the storage unit 4.

Figure 3B:
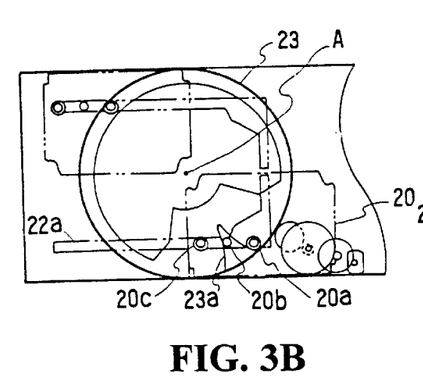
Figure 3C:
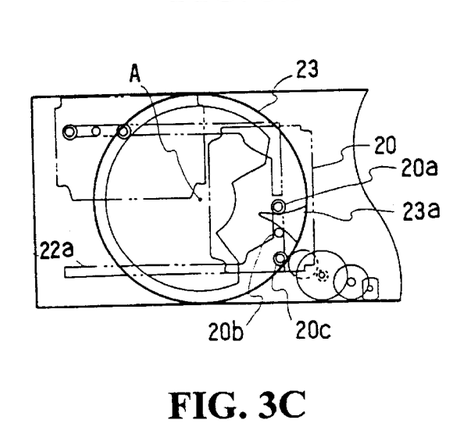
Figure 3D:
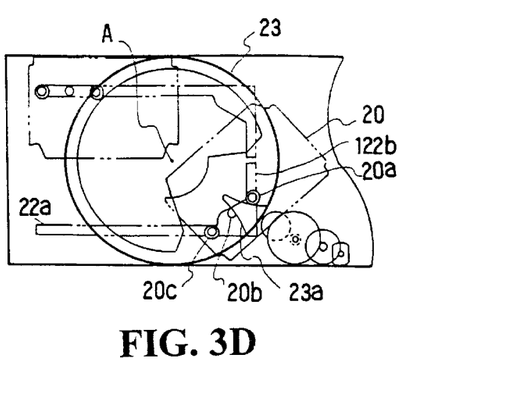
Figure 3E:
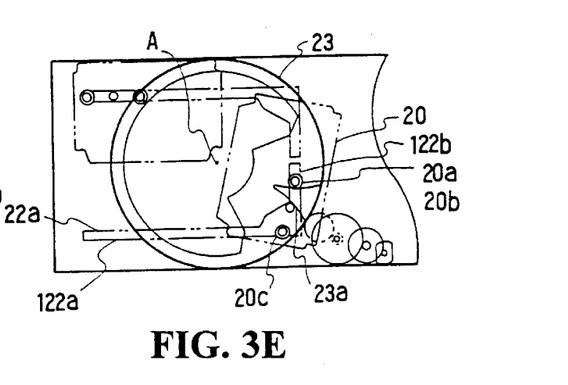
Figure 3F:
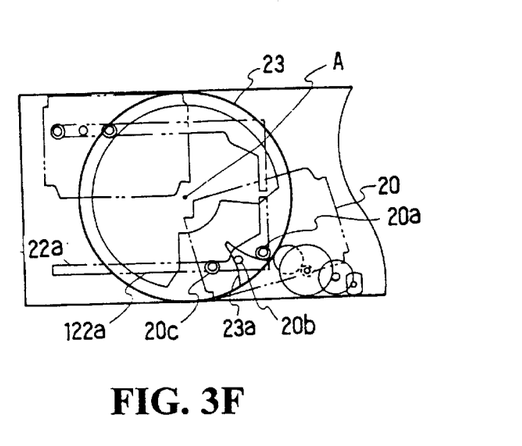

With further rotation of the movable member 23, the pin 20a is pushed by the projection 23a and moved along the groove 22a. The carrier 20 has three pins 20a to 20c, which are thus moved along the groove 22a as shown in FIG. 3(b), thus causing parallel movement of the carrier 20 and the storage unit 4 along the groove 22a. With still further rotation of the movable member 23, the carrier 22a is moved continually until the pin 20b gets out of a straight portion 122a of the groove 22 as shown in FIG. 3(c), whereupon the carrier 22 turns to be rotated. With further rotation of the movable member 23, the carrier 22 is continually rotated, and the pin 20a eventually enters the straight portion 122b of the groove 22a having been rotated by 90 degrees as shown in FIG. 3(d) and the pin 20b enters the straight portion 122a of the groove 22a as shown in FIG. 3(e), thus bringing an end to the movement and rotation of the carrier 20 and the storage unit 4.

Figure 4A:
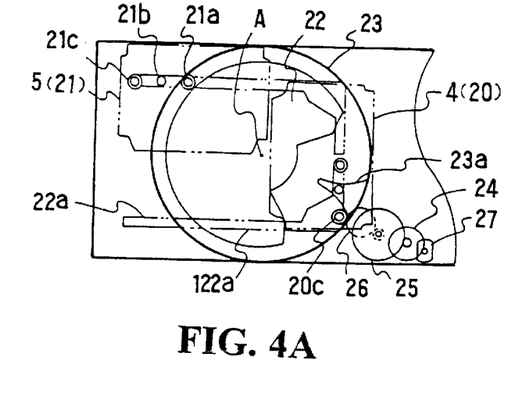
FIGS. 4(a) to 4(f) are plan views, partly broken away, illustrating the operation of storage unit replacement in FIG. 1.

Now, a method of storage unit replacement (by bringing the storage unit back to a stand-by area) will be described with reference to FIGS. 4(a) to 4(f). In FIG. 4(a), the carrier 20 and the storage unit 4 are shown in their position capable of being accessed. In this state, the motor 27 is driven to cause reduction of the rotational number of the motor 27 via the first to third gears 24 to 26 and transmission of the torque motor 27 via the third gear 26 to the movable member 23. The movable member 23 thus turns to be rotated about the point A. After a certain period of time from the start of rotation, the projection 23a of the movable member 23 is brought into contact with the pin 20c.

Figure 4B:
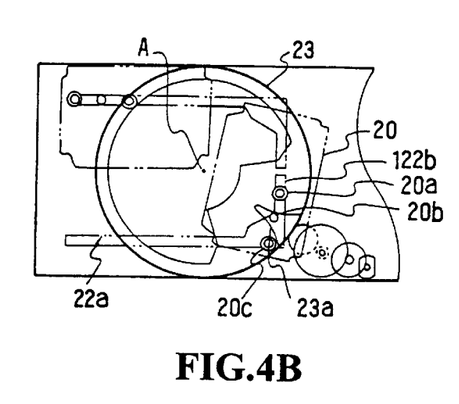
Figure 4C:
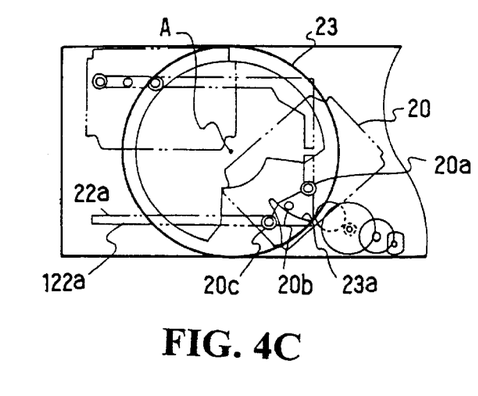
Figure 4D:
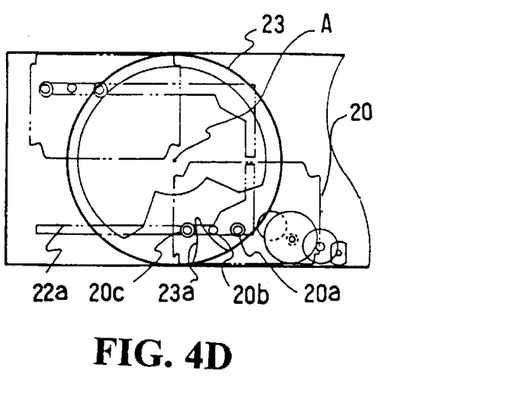
Figure 4E:
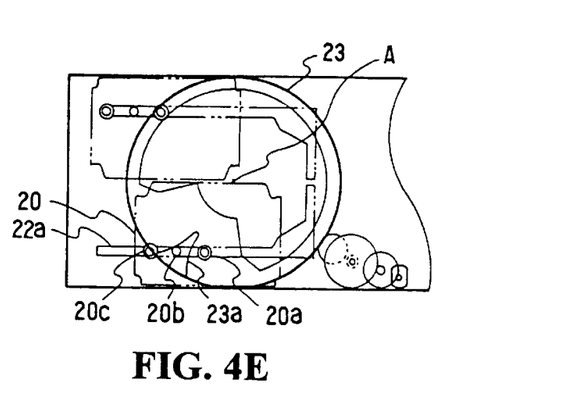
Figure 4F:
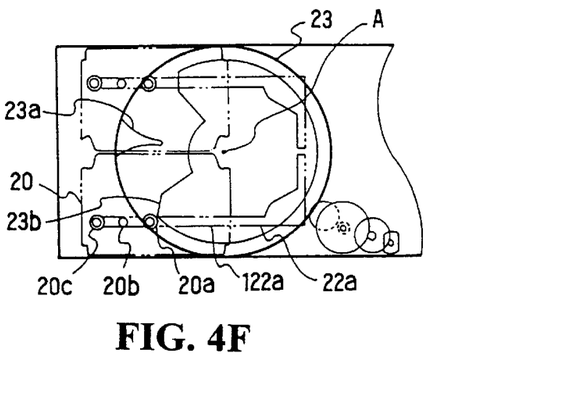

With further rotation of the movable member 23, the carrier 20 turns to be moved and, as shown in FIG. 4(b), the pin 20b eventually gets out of engagement from the straight portion 122b of the groove 22a, whereupon the carrier 20 turns to be rotated. With further rotation of the movable member 23, the carrier 20 is rotated continually and, as shown in FIG. 4(c), the pin 20a eventually enters the straight portion 122a of the groove 20a. With still further rotation of the movable member 23, as shown in FIG. 4(d), the pin 20b eventually enters the straight portion 122a of the groove 22a, thus completing the rotational operation. With further rotation of the movable member 23, the carrier 20 and the storage unit 4 are moved straight and, as shown in FIG. 4(e), the front end projection 20c gets out of the pin 20c. (FIG. 4(e) shows the state right before the projection 23a gets out of the pin 20c.) Also with further rotation of the movable member 23, the rear end projection 23b of the movable member 23 is brought into contact with the pin 20a, whereupon the carrier 20 turns to be moved again. With further rotation of the movable member 23, the movement and rotation of the carrier 20 and the storage unit 4 are completed, and the rear end projection 20b gets out of the pin 20a. (FIG. 4(f) shows the state right before the rear end projection 23b gets out of the pin 20a.)

The carrier 21 and the storage unit 5 which are disposed transversally symmetrically with respect to the carrier 20 and the storage unit 4, can be moved likewise by causing further rotation of the movable member 23 in the clockwise direction.

As has been shown, the space in the library 1 in the width direction thereof can be effectively utilized by combining the straight movement and rotational movement of the carrier 20 and the storage unit 4 (or the cartridge 21 and the storage unit 5).

While the above embodiment has been described in connection with the case where the two storage units 4 and 5 are provided, it is possible to increase the library capacity by providing three or more storage units in a row in the width direction of the library 1. In this case, only a single motor 27 suffices as the drive source if the movable members 23 are coupled together by a gear train.

It is further possible to use the storage units 4 and 5 as magazines by arranging such that the units can be mounted and dismounted on and from the carriers 20 and 21.

A second embodiment of the library according to the present invention will now be described with reference to FIGS. 5(a) to 5(c) and 6.

Figure 5A:
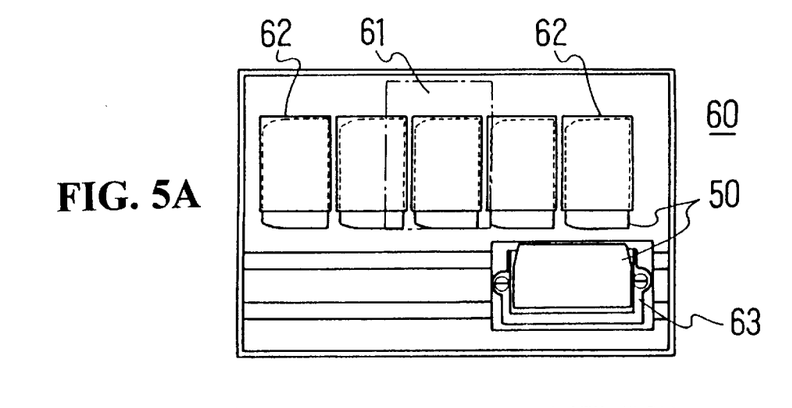
FIGS. 5(a) to 5(c) are views representing another embodiment of the present invention.
Figure 5B:
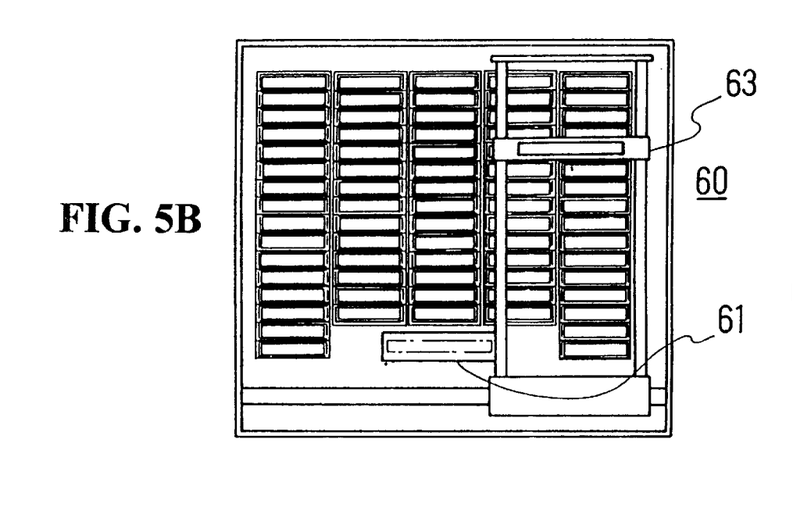
Figure 5C:
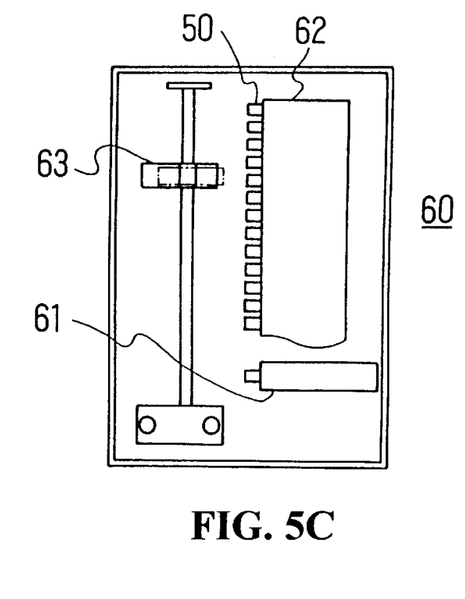

Referring to FIGS. 5(a) to 5(c), this embodiment of the library 60 comprises a drive unit 61 disposed in its lower central part and serving to read and write data from and in media accommodated in cartridges 50, a cartridge transfer mechanism 63 disposed at a position ahead of and accessible to a cartridge 50 in it and serving to cause movement and rotation of the cartridge 50, and a plurality of storage units 62 each capable of accommodating a cartridge 50 having been rotated by 90 degrees with respect to a cartridge inserting direction of the library.

Figure 6:
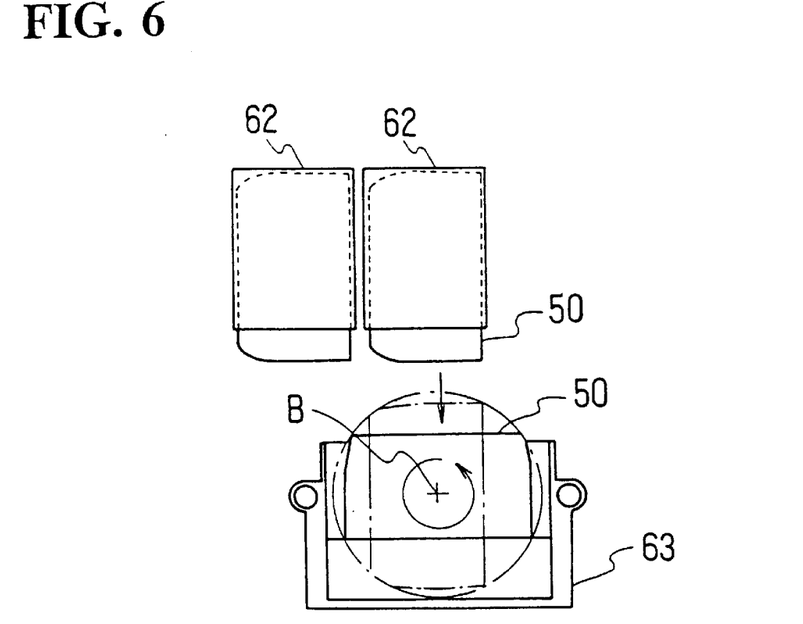
FIG. 6 is a schematic view showing details of storage units and the cartridge transfer mechanism shown in FIGS. 5(a) to 5(c)

FIG. 6 is a schematic view showing details of storage units and the cartridge transfer mechanism shown in FIGS. 5(a) to 5(c). The method of transferring a cartridge 50 from a storage unit 62 to the drive unit 61 is as follows. First, the cartridge transfer mechanism 63 is moved to a position corresponding to a designated cartridge 50. Then, the cartridge transfer mechanism 63 rotates the cartridge 50 by 90 degrees, and takes out the cartridge 50 in this state. The cartridge transfer mechanism 63 then rotates the taken-out cartridge 50 in the opposite direction.

Thereafter, the cartridge transfer mechanism 63 loads the cartridge 50 in the drive unit 61. The cartridge 50 can be transferred from the drive unit 61 back to the storage unit 62 in a manner similar to the above method.

As shown above, with the above construction the cartridge transfer mechanism 63 can rotate the cartridge 50 mounted in the storage unit 62 by 90 degrees, then takes out the cartridge 50 in this state, then rotates the taken-out cartridge 50 in the opposite direction by 90 degrees and loads the cartridge 50 in the drive unit 61. Thus, where the cartridge 50 has such transversal and longitudinal dimensions that the one in the direction of its insertion into the library 61 is smaller, the width of the library can be reduced to increase the efficiency of accommodation of cartridges 50 in the case of accommodating the cartridge 50 having been rotated by 90 degrees compared to the case of accommodating the storage units in two rows in the width direction of the library 60. In addition, the cartridge 50 can be moved vertically while it is rotated, and it is thus possible to reduce the access time.

As has been described in the foregoing, according to the present invention it is possible to provide a library, in which where the cartridge has such transversal and longitudinal dimensions that the one in the direction of its insertion into the library is smaller, the width of the library can be reduced to increase the efficiency of accommodation of cartridges in the case of accommodating the cartridge having been rotated by 90 degrees compared to the case of accommodating the storage units in two rows in the width direction of the library, and also the storage units can be moved vertically while being rotated, thus permitting access time reduction.

In addition, according to the present invention it is possible to provide a library, which requires low cost of manufacture as well as permitting the cartridge accommodation efficiency increase and access time reduction.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A library comprising:
   a first storage unit capable of storing a plurality of cartridges in a stacked arrangement, the plurality of cartridges accommodating storage media;
   a second storage unit capable of storing the plurality of cartridges in the stacked arrangement;
   a drive unit for reading data from the storage media and writing data in the storage media; and
   a cartridge transfer mechanism for transferring the plurality of cartridges between the drive unit and either of the first storage unit or the second storage unit,
   wherein the first storage unit accommodates a cartridge having been rotated independently of the second storage unit horizontally by approximately 90 degrees with respect to a cartridge inserting direction of the library,
   wherein the first storage unit and the second storage unit with the cartridges mounted therein are moved along an approximately L-shaped groove to cause straight movement and rotation by approximately 90 degrees, thereby moving the plurality of cartridges to a position accessible by the cartridge transfer mechanism.

2. The library according to claim 1, wherein the first storage unit and the second storage unit each comprise:

guide pin means projecting from a bottom surface thereof;

a track member having the substantially L-shaped groove for guiding the guide pin means disposed beneath the first storage unit and the second storage unit;

a movable member having projection means capable of being brought into contact with the guide pin means disposed beneath the track member, wherein the first storage unit and the second storage unit are capable of moving independently along the substantially L-shaped groove with movement of the guide pin means along the substantially L-shaped groove.

3. A library comprising:

a first storage unit capable of storing a plurality of cartridges in a stacked arrangement, the plurality of cartridges accommodating storage media;

a second storage unit capable of storing the plurality of cartridges in the stacked arrangement;

a drive unit for reading data from the storage media and writing data in the storage media; and a cartridge transfer mechanism for transferring the plurality of cartridges between the drive unit and either of the first storage unit or the second storage unit, wherein the first storage unit accommodates a cartridge having been rotated independently of the second storage unit horizontally by approximately 90 degrees with respect to a cartridge inserting direction of the library, wherein the cartridge transfer mechanism serves to rotate the cartridge mounted in either the first storage unit or the second storage unit by approximately 90 degrees, then takes out one of the cartridge in this state, then rotates the taken-out cartridge in the opposite direction by approximately 90 degrees and then loads the taken-out cartridge in the drive unit.

4. A library comprising:

a drive unit disposed in a rear top part of the library and serving to read data from storage medium and write data in the storage medium accommodated in a cartridge;

a cartridge transfer mechanism disposed ahead of the drive unit to access the cartridge therein and serving to move the cartridge;

a first storage unit capable of accommodating the cartridge which has been rotated by 90 degrees with respect to a cartridge inserting direction of the library, and having been moved and rotated when accessed by the cartridge transfer mechanism and accommodating a plurality of cartridges one above another;

a second storage unit disposed transversally symmetrically with and having substantially a same role as the first storage unit, the second storage unit capable of independently rotated by 90 degrees with respect to the first storage unit;

a storage unit transfer mechanism for moving the first and second storage units; and a control unit for controlling the cartridge transfer mechanism and the storage unit transfer mechanism.

5. The library according to claim 1, wherein the storage unit transfer mechanism includes:

a first carrier, for supporting the first storage unit, comprising depending long pins each having a free end portion and a depending short pin;

a second carrier, for supporting the second storage unit, comprising depending long pins and a depending short pin;

a track member disposed beneath the first carrier and the second carrier, the track member having an L-shaped and transversally symmetrical groove for receiving the long and short pins;

a disc-shaped movable member having projections formed at a top thereof and which is supported for rotation about a point in a central part of the library;

a gear train disposed adjacent to the outer periphery of the movable member which includes a plurality of gears which transmit a torque of a motor to the movable member.

6. A library comprising:

a drive unit disposed in a lower central part of the library and serving to read data from media and write data in the media accommodated in cartridges;

a cartridge transfer mechanism disposed at a position ahead of and accessible to at least one cartridge and serving to cause movement and rotation of the at least one cartridge; and a plurality of storage units each capable of accommodating at least one of the at least one cartridge, each of said plurality of storage units capable of being independently rotated by approximately 90 degrees with respect to one another and to a cartridge inserting direction of the library, wherein the cartridge transfer mechanism rotates the cartridge mounted in either the first storage unit or the second storage unit by approximately 90 degrees, then takes out one of the cartridge in this state, then rotates the taken-out cartridge in the opposite direction by approximately 90 degrees and then loads the taken-out cartridge in the drive unit.

* * * * *